United States Patent Office 3,421,869
Patented Jan. 14, 1969

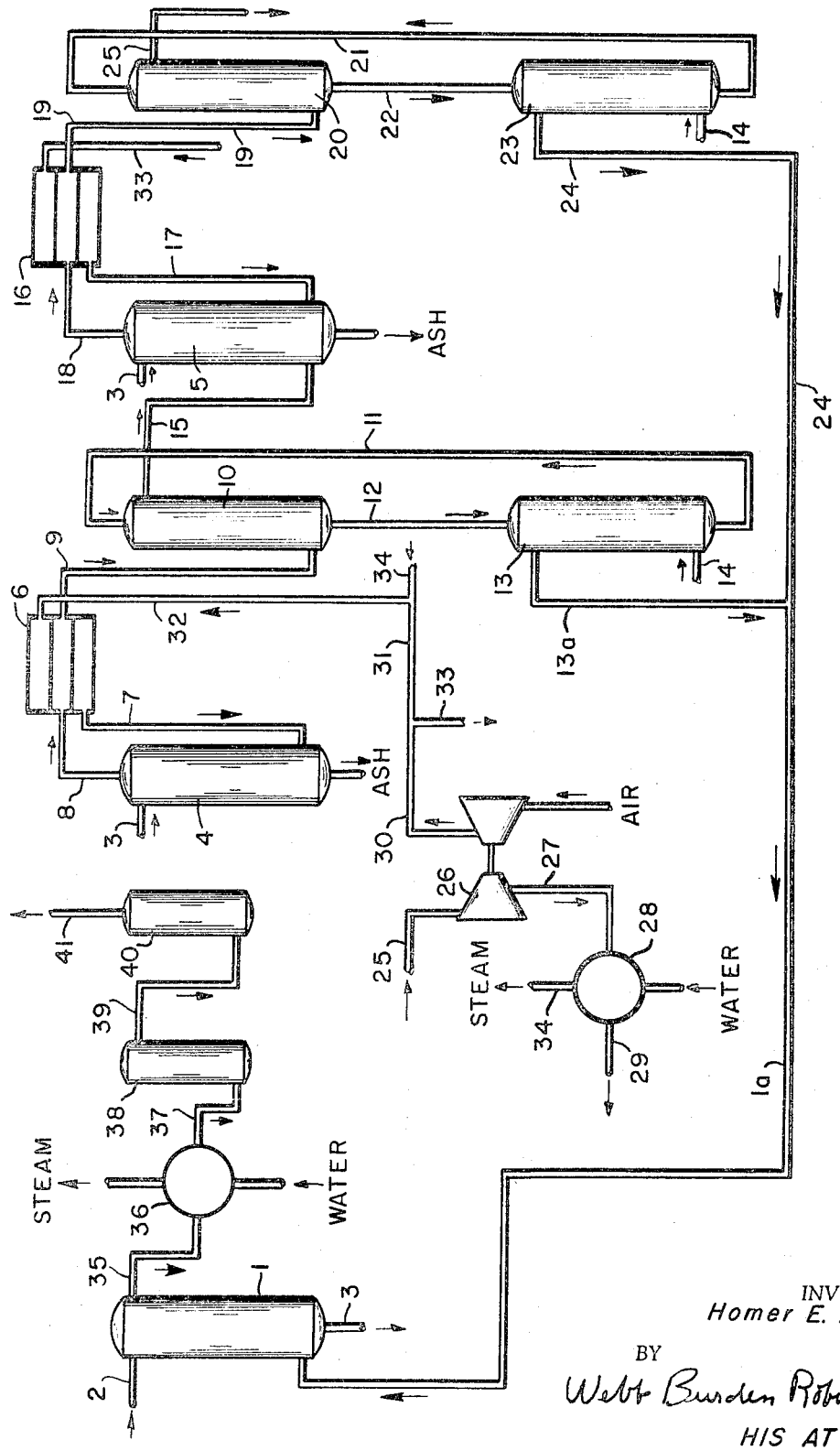

3,421,869
METHOD FOR THE PRODUCTION OF A MIXTURE OF HYDROGEN AND STEAM
Homer E. Benson, Shaker Heights, Ohio, assignor to Consolidated Gas Service Corporation, Cleveland, Ohio, a corporation of Delaware
Filed June 1, 1964, Ser. No. 371,447
U.S. Cl. 48—197          2 Claims
Int. Cl. C01b 1/08

ABSTRACT OF THE DISCLOSURE

A process for the production of a mixture of hydrogen and steam wherein steam and air are reacted with carbonaceous materials to produce a first producer gas which is then reacted with iron oxide to produce a lower iron oxide and metallic iron which in turn is reacted with steam to produce hydrogen and steam. The spent producer gas from the reaction with iron oxide is reacted with carbonaceous material and air to enrich the spent producer gas, which is thereafter reacted with iron oxide to reduce the oxide to a lower oxide and metallic iron, which are in turn reacted with steam to produce additional hydrogen and steam.

---

This application relates to method and apparatus for producing a mixture of hydrogen and steam and more particularly to method and apparatus for producing a mixture of hydrogen and steam by the steam-iron process.

The steam-iron process is a well-known process for producing hydrogen in which carbon monoxide and hydrogen generated by a gas producer are used in a reductor vessel to reduce iron oxides ($Fe_3O_4$) to a lower oxide (FeO) and metallic iron. The FeO and metallic iron at an elevated temperature are fed into an oxidizer vessel where it reacts with steam to produce a mixture of hydrogen and unreacted steam.

As is well known, the steam-iron process has thermodynamic limitations such that it is possible to utilize only about 60 percent of the hydrogen and carbon monoxide contained in the producer gas to reduce iron oxide to metallic iron. I have invented method and apparatus whereby the hydrogen and carbon monoxide in the producer gas can be utilized more effectively in the steam-iron process, thus, decreasing the amount of spent producer gas which would otherwise be lost.

In my copending application Ser. No. 172,687, filed Feb. 12, 1962, and now Patent No. 3,222,147, issued Dec. 7, 1965, I describe and claim a process for the preparation of mixtures of hydrogen, carbon monoxide and methane in which carbonaceous materials such as coal, lignite, oil, or the like, are reacted with hydrogen under pressure to produce methane gas and in which the hydrogen required for that reaction is provided by apparatus utilizing the steam-iron process. The subject of this present application is particularly useful for carrying out the process described in said copending application, and, therefore, it will be described with reference thereto. However, it is to be understood that this invention is useful whenever an efficient production of hydrogen by the steam-iron process is desired.

As stated above, the source of reducing gas for reducing iron oxide to metallic iron in the steam-iron process is a producer gas generator. A typical fresh producer gas has the following composition:

| | |
|---|---:|
| CO | 22.0 |
| $CO_2$ | 6.0 |
| $H_2$ | 20.4 |
| $H_2O$ | 9.5 |
| $CH_4$ | 2.3 |
| $H_2S$ | 0.2 |
| $N_2$ | 39.6 |
| | 100.0 |

The reactions in the iron reductor vessel are as follows:

$$Fe_3O_4 + H_2 \rightleftharpoons 3FeO + H_2O$$

$$FeO + H_2 \rightleftharpoons Fe + H_2O$$

$$CO + Fe_3O_4 \rightleftharpoons 3FeO + CO_2$$

$$CO + FeO \rightleftharpoons Fe + CO_2$$

Thermodynamic limitations in the oxygen-iron system prevent the complete utilization of the hydrogen and carbon monoxide contained in the producer gas to reduce iron oxide.

For the same reason, the iron oxides are not reduced completely to metallic iron so that in the reductor vessel there is always a mixture of $Fe_3O_4$, FeO and Fe. The proportion of these ingredients will also vary in accordance with the solids circulation rate. Table I below sets out the equilibrium ratios of $CO_2$ to CO and $H_2O$ to $H_2$ for different temperatures of reaction.

TABLE I

| Temperature, °F. | Phase | Equilibrium ratio | |
|---|---|---:|---:|
| | | $CO_2/CO$ | $H_2O/H_2$ |
| 932 | $Fe_3O_4$/Fe | 1.06 | 0.21 |
| 1,112 | $Fe_3O_4$/FeO | 1.05 | 0.46 |
| | FeO/Fe | 0.90 | 0.33 |
| 1,292 | $Fe_3O_4$/FeO | 1.68 | 1.12 |
| | FeO/Fe | 0.68 | 0.42 |
| 1,472 | $Fe_3O_4$/FeO | 2.40 | 2.35 |
| | FeO/Fe | 0.55 | 0.50 |
| 1,652 | $Fe_3O_4$/FeO | 3.24 | 4.50 |
| | FeO/Fe | 0.47 | 0.58 |

A typical temperature at which the processes here involved might be carried out is 1472° F. at which the equilibrium ratios of $CO_2$ to CO and $H_2O$ to $H_2$ are 2.40 and 2.35, respectively, for the reduction of $Fe_3O_4$ to FeO. Calculations assuming perfect approach to equilibrium show that the percentage conversion of the $H_2$ and CO which are the reducing components is 59.5 percent. Thus, more than 40 percent of the potential reducing capacity of the producer gas is wasted so far as iron reduction is concerned by the conventional steam-iron process.

I have found that substantial savings in the amount of carbonaceous materials used in the steam-iron process can be effected if spent producer gas from the iron oxide reducing vessel is passed into a second gas producer and reacted with carbonaceous material (for example, char from a hydrogasifier) and air to enrich the spent producer gas in $H_2$ and CO. The enriched gas is then passed to a second iron reducing vessel.

The reactions occurring in the second gas producer are as follows:

$$H_2O + C \rightleftharpoons H_2 + CO$$
$$CO_2 + C \rightleftharpoons 2CO$$

Because the spent producer gas has substantial quantities of water vapor, no additional steam need be added to the second gas producer. However, the above reactions are endothermic, and, therefore, air is introduced into the second gas producer to burn some of the char introduced into the second gas producer to provide the heat to carry out the reactions. Advantage is also taken of the high level of preheat due to the high temperature level (1400° F. to 1500° F.) of the spent producer gas.

The table below shows the extent to which the spent producer gas which leaves the first iron oxide reducing vessel has been enriched in CO and $H_2$ by reacting the water vapor and $CO_2$ of the spent producer gas in a second gas producer.

TABLE II

|  | Spent producer gas, percent | Upgraded producer gas, percent |
|---|---|---|
| CO | 8.2 | 26.5 |
| $CO_2$ | 19.8 | 7.2 |
| $H_2$ | 8.9 | 11.1 |
| $H_2O$ | 21.0 | 5.2 |
| $CH_4$ | 3.3 | 3.9 |
| $H_2S$ | 0.2 | 0.3 |
| $N_2$ | 38.6 | 45.8 |
|  | 100.0 | 100.0 |

Reference to Tables I and II shows the value of the step of upgrading the producer gas in the second gas producer. In the upgraded producer gas, the ratio of $CO_2$ to CO is .27 which is well below the equilibrium ratio of 0.55 at 1472° F. as shown in Table I, and, therefore, the mixture of $CO_2$ to CO in the upgraded producer gas is reducing with respect to the FeO phase. The ratio of $H_2O$ to $H_2$ in the upgraded producer gas is 0.47 which is only barely reducing with respect to FeO at 1472° F. as the equilibrium ratio is 0.50. However, the hydrogen can be utilized to reduce $Fe_3O_4$ to FeO. Therefore, as explained hereinafter, less producer gas and less carbonaceous materials are required to reduce a given amount of iron. Likewise, if the hydrogen and steam produced in the steam-iron process are fed to a hydrogasifier in accordance with my application Ser. No. 172,687, less carbonaceous materials will be used to produce a given amount of methane than would be required if the conventional steam-iron process was utilized.

The accompanying drawing is a schematic diagram illustrating method and apparatus for carrying out my invention.

In the drawing, I have shown my invention as part of apparatus for generating a high B.t.u. gas from carbonaceous material by reacting that material with hydrogen and steam in a hydrogasifier 1 as is described and claimed in my copending application Ser. No. 172,687. Carbonaceous material is fed to the top of the hydrogasifier 1 through a conduit 2 and passes through the hydrogasifier in a free fall, fluidized or moving bed. It leaves the hydrogasifier as char through a conduit 3.

Conduit 3 feeds the char from the hydrogasifier to a first gas producer 4 and a second gas producer 5. Steam and air heated in heat exchanger 6, as hereinafter described, flow through conduit 7 to the bottom of the gas producer 4 and flow upwardly through the char which is maintained preferably in a fluidized bed in the reaction zone of the gas producer since char from the hydrogasifier is in a relatively fine particle state. Hot producer gas (e.g., 1800° F. at 1000 p.s.i.g.) flows through conduit 8 to the heat exchanger 6, thereby heating the air and steam supplied to the producer 4 and from the heat exchanger through conduit 9 to the bottom of a first iron reductor 10. The producer gas flows upwardly through the reaction zone of the iron reductor 10 in countercurrent flow to iron oxide (mainly $Fe_3O_4$) which is supplied to the top of the reductor through a steam or gas lift 11.

The producer gas leaving the first gas producer 4 has a temperature of between 1700° F. and 2000° F. and is cooled in the heat exchanger to about 1400° F., and the reduction of the higher iron oxide to lower iron oxide and metallic iron in the iron reductor 10 is carried on at a temperature from 1400° F. to 1500° F., depending upon the circulation rate of the iron oxide. In the iron reductor, the contact may be fluidized bed or free falling with baffles to increase the solids residence time in the reactor.

Reduced iron flows through conduit 12 into the reaction zone of iron oxidizer 13 into which steam is supplied through conduit 14. Hydrogen and steam formed by the oxidation of the iron flow from the top of the iron oxidizer through conduits 13a and 1a to the hydrogasifier 1. The iron oxide (predominately $Fe_3O_4$) is carried by a fluid lift 11 to the iron reductor 10. Preferably, steam is used as the lift gas and is reused in the iron oxidizer 13 after being cleaned of solids by conventional means, not shown.

Spent producer gas leaves the iron reductor 10 through conduit 15 to the bottom of a second gas producer 5 where it reacts in the reaction zone of the producer with char supplied through conduit 3 and with air which has been heated in heat exchanger 16 and supplied to the gas producer through conduit 17.

The spent producer gas, char and air react according to the formulas set out above, and the effect of the reactions is to enrich the producer gas as set out in Table II above. The temperature of the reactions is between 1700° F. and 2000° F. and the enriched upgraded producer gas flows through conduit 18 to heat exchanger 16 where it heats the air supplied to the gas producer 5 and then flows through conduit 19 to the bottom of a second iron reductor 20. The same reactions are carried out in the reaction zone of the second iron reductor 20 as are carried out in the first reductor 10. Producer gas contacts iron oxide supplied through fluid lift 21 and reduced iron flows through conduit 22 to the reaction zone of a second iron oxidizer 23. Steam and hydrogen generated in the iron oxidizer 23 flow through conduit 24 to conduit 1a and thence to the hydrogasifier 1.

Spent producer gas flows from the iron reductor 20 through conduit 25 and expander compressor 26 and then through conduit 27 to a waste heat boiler 28 and then to a stack through conduit 29. The expander compressor 26 supplies air through conduits 30, 31 and 32 to the first gas producer 4 through the heat exchanger 6. It also supplies air through conduits 30 and 33 to the second gas producer 5 through heat exchanger 16.

The waste heat boiler 28 supplies steam through conduit 34 to the first gas producer 4 and through conduits 14 to the iron oxidizers 13 and 23.

As explained in my copending application Ser. No. 172,687, the steam-hydrogen mixture containing approximately 30–50 percent hydrogen flows from the iron oxidizers 13 and 23 through conduit 1a directly into the hydrogasifier 1 because of the fact that the entire system is operated at the same pressure, preferably above 500 p.s.i.g. Raw product gases leave the hydrogasifier 1 through a conduit 35 to a waste heat boiler 36 and thence through conduit 37 to a gas purifier section 38 where carbon dioxide, hydrogen sulfide and organic sulfur are removed by conventional methods. The hydrogen and carbon monoxide flow through conduit 39 to a catalytic methanation reactor 40 from which the final product gas flows through conduit 41.

The schematic representation of my invention in the drawing is intended only as a flow sheet to assist in understanding the invention. Pumps, valves, and the like have been purposely omitted in the interests of simplicity of illustration. It is not intended to imply that conventional control equipment is not required to practice my invention, but persons skilled in the art can determine readily where conventional control devices are required.

Table III below compares the production of a hydrogen steam-iron unit using a single gas producer with a steam-iron unit embodying my invention in which a two-stage gas producer is used as has been described above.

TABLE III

|  | A | B | C | D |
|---|---|---|---|---|
|  | 1st stage producer | 2nd stage producer | Both stages average | Percent improvement C over A |
| Moles $H_2$+CO made/mole C used | 1.27 | 1.77 | 1.52 | 20 |
| Moles $H_2$+CO made/mole air used | 0.89 | 1.32 | 1.10 | 24 |
| Moles $H_2$ made/mole C used | 0.76 | 1.08 | 0.92 | 21 |
| Moles $H_2$ made/mole air used | 0.53 | 0.80 | 0.66 | 25 |
| Moles $H_2$ made/mole steam fed | 0.84 | (¹) | 2.10 | 150 |
| Moles producer gas/mole C used | 3.00 | 4.74 | 3.86 | 29 |
| Moles spent producer gas/mole $H_2$ made | 3.97 | ---------- | 2.63 | 34 |

¹ No steam.

Comparing columns A and B, it will be seen that the second stage of the producer is considerably more efficient than the first stage. However, it is not possible to use a second stage without a first stage, and, therefore, I have averaged the production of the two stages in comparing the two-stage producer of my invention with the conventional one-stage producer in column D. However, Table III also shows the advantage of my two-stage producer over two conventional single stage producers each supplying producer gas to an iron reductor and each receiving the same amount of carbonaceous material as is supplied to each stage of my gas producer. Two moles of carbon (one to each single stage producer) would produce 6 moles of producer gas, whereas, two moles of carbon produce in my two-stage producer 7.74 moles of producer gas, a gain of 29 percent.

The overall thermal efficiency of a coal-to-gas plant using only a one-stage gas producer is 60 percent. If a two-stage gas producer is used according to my invention, the thermal efficiency of the plant is increased to 68.2 percent which is a significant increase in efficiency.

Assuming a plant having a capacity of 135 million cubic feet per day of pipeline gas having a heating value of 1000 B.t.u. per cubic foot, the savings in daily operating expenses in using a two-stage gas producer instead of the conventional single-stage gas producer are set out in Table IV below.

TABLE IV

|  | One-stage | Two-stage | Savings |
|---|---|---|---|
| (1) Coal char, tons/day | 4,770 | 3,910 | 860 |
| (2) Steam, lbs./day | 7,440,000 | 2,980,000 | 4,460,000 |
| (3) Air, lbs./day | 18,900,000 | 15,000,000 | 3,900,000 |
| (4) Air compression, HP | 88,300 | 70,700 | 17,600 |
| (1) Coal at $5/ton, dollar/day | 23,850 | 19,550 | $4,300 |
| (2) Steam at $0.50/M lbs., dollar/day | 3,720 | 1,490 | 2,230 |
| (3) Air Compression at $0.01/kw-hr., dollar/day | 15,810 | 12,650 | 3,160 |
| Total savings per day |  |  | $9,690 |

Operating savings $\frac{\$9,690}{135,000 \text{ m.c.f.d}} = \$0.072/\text{m.c.f.}$ The approximate cost of pipeline gas made in accordance with the process described in my copending application Ser. No. 172,687 in which a single stage gas producer is used is $0.55/m.c.f. A savings of $0.072/m.c.f. is, therefore, substantial, amounting to 13 percent.

Table V below compares the capital costs for a plant of the same capacity as was used in Table IV in which a two-stage gas producer system is used instead of the conventional one-stage gas producer.

TABLE V

|  | Steam-iron plant with one-stage gas producer | Steam-iron plant with two-stage gas producer |
|---|---|---|
| Hydrogen plant cost | $20,100,000 | $16,900,000 |
| Hydrogenation plant cost | 34,700,000 | 33,900,000 |
| Total plant cost | $54,800,000 | $50,800,000 |

Savings of $4,000,000 or 7.3% in capital investment.

Tables IV and V show that not only are daily operating expenses sharply reduced by my invention, but also the capital costs of a gas plant are likewise reduced.

The advantages of my invention have been explained with reference to its use in the production of pipeline gas in which hydrogen and steam are supplied directly to a hydrogasifier and in which the availability of steam at high temperature is important. However, my invention is also of value in various applications where only hydrogen is desired in which case the steam would be removed from the hydrogen by condensation.

While I have described certain presently preferred embodiments of my invention, it is to be understood that it may be otherwise variously embodied within the scope of the appended claims.

I claim:
1. A process for preparing a mixture of hydrogen and steam which comprises,
   (A) reacting steam and air with carbonaceous materials in a first reaction zone to generate producer gas containing hydrogen and carbon monoxide,
   (B) reacting the producer gas with iron oxide in a second reaction zone to reduce the oxide to a lower oxide and metallic iron,
   (C) reacting the lower oxide and metallic iron with steam in a third reaction zone to produce hydrogen and steam,
   (D) reacting spent producer gas from reduction of iron oxide in Step B with carbonaceous material and air in a fourth reaction zone to enrich the spent producer gas in hydrogen and carbon monoxide,
   (E) reacting the enriched producer gas with iron oxide in a fifth reaction zone to reduce the oxide to a lower oxide and metallic iron, and
   (F) reacting the lower oxide and metallic iron from Step E with steam in a sixth reaction zone to produce additional hydrogen and steam.

2. A process for preparing a mixture of hydrogen and steam which comprises,
   (A) reacting producer gas with iron oxide in a first reaction zone to reduce the iron oxide to a lower oxide and metallic iron,
   (B) reacting the lower oxide and metallic iron with steam in a second reaction zone to produce hydrogen and steam,
   (C) reacting spent producer gas from reduction of iron oxide in a third reaction zone with carbonaceous material and air to increase the hydrogen and carbon monoxide content of the producer gas,
   (D) reacting the producer gas which has been enriched in hydrogen and carbon monoxide with iron oxide in a fourth reaction zone to reduce the iron oxide to a lower oxide and metallic iron, and
   (E) reacting the lower oxide and metallic iron from Step D with steam in a fifth reaction zone to produce additional hydrogen and steam.

References Cited

UNITED STATES PATENTS 3,222,147  12/1965  Benson _____ 48—197

MORRIS O. WOLK, *Primary Examiner.*

R. M. REESE, *Assistant Examiner.*

U.S. Cl. X.R.

23—214